TAPE TRANSPORT ASSEMBLY

Filed Feb. 11, 1965

INVENTORS.
JOHN T. GARDINER
MAGNE JARLE KJOS
BY
Christie, Parker & Hale
ATTORNEYS.

3,348,784
Patented Oct. 24, 1967

3,348,784

TAPE TRANSPORT ASSEMBLY

John T. Gardiner, Monrovia, and Magne Jarle Kjos, Duarte, Calif., assignors to Burroughs Corporation, Detroit, Mich., a corporation of Michigan Filed Feb. 11, 1965, Ser. No. 431,873
13 Claims. (Cl. 242—55.12)

This invention relates to devices employing tape suitable for the storage of information, and, more particularly, to an improved apparatus for automatically transporting such tape between a source reel and a pickup reel.

Magnetic tape recorders suitable for the recording and reproduction of music and speech are well known in the art. Data processors utilizing such tape for the storage of digital data are also well known as are such processors which utilize other types of information storage means such as, for example, magnetic cores or paper tape having holes punched therein.

A magnetic tape recorder suitable for the recording and reproduction of music and speech and adapted for the automatic playing of a plurality of tapes has recently been marketed by the Minnesota Mining and Manufacturing Co. as the "Revere-Wollensak Automatic Tape Recorder." The Revere recorder utilizes a cartridge, sold commercially by Minnesota Mining and Manufacturing Co., which comprises a source reel and a spool of magnetic tape wound thereon. The tape is driven between the source reel and a specially adapted pickup reel, and past a recording head positioned intermediate of the two reels, by means of three distinct power applications. The first application of power drives a feed-out and rewind roller, which in turn drives the tape during the feedout phase of operation. The second application of power drives a pair of pinch drive rollers which drive the tape during the recording or reproduction phase of operation. The two pinch drive rollers are positioned on opposite sides of the tape and are movably mounted in a manner which enables them to pinch the tape between the rollers thereby to drive the tape past the recording head at a fixed constant speed. The third application of power drives the pickup reel.

The present invention represents an improved apparatus for automatically driving tape between a source reel and pickup reel and past a recording head positioned between the two reels. The present invention may utilize a tape cartridge and feed-out and rewind roller identical to, and a pickup reel similar to, those utilized in the previously referred to Revere recorder. Apart from these similarities, however, the present invention is structurally completely different from and operates in a manner different from the Revere recorder. Moreover, the present invention represents a distinct improvement over prior art tape transport assemblies such as that used in the Revere recorder.

The present invention provides a number of advantages over prior art tape transport assemblies. It provides an assembly which offers a significant saving in the expense of constructing such an assembly. Such saving is achieved since the assembly of the present invention requires but two power applications which may conveniently be provided by a single power source.

The present invention also provides a tape transport assembly capable of operation at tape speeds in excess of 20 inches per second as required in digital data recording operations as well as at slower speeds such as, for example, 1⅞ inches per second common for speech and music recording applications.

Furthermore, the present invention provides a means for controlling the tension within the tape as it passes between the source reel and pickup reel.

Additionally, the present invention does not require that the tape be driven at an intermediate take-up speed subsequent to the feed-out phase of operation and prior to full-speed operation.

The preceding and other advantages of the present invention are achieved by means of a tape transport assembly in which a single power source is used to drive both a feed-out and rewind roller and a pair of drive rollers. The drive rollers themselves are utilized to drive the pickup reel thereby eliminating the necessity of an additional power application, probably requiring an additional power source, to drive this reel. The pickup reel is affixed to a housing, which supports the entire tape transport assembly, in a manner which permits it to move in a vertical direction. The reel receives vertical support from the pair of drive rollers which also make contact with the tape at the points of reel support.

In order to achieve automatic loading, the pickup reel is of the split reel type, as is the pickup reel of the Revere recorder. In order to achieve precise control of lateral flange movement of the pickup reel and to prevent tape buckling which may arise from the means of tape drive and high speeds of operation utilized in the present invention, an electromagnetic holding coil is incorporated into the pickup reel of the present invention.

The proper degree of tension in the tape to assure tight winding of the tape on the pickup reel and to provide the proper amount of tension in the tape as it passes a recording head intermediate the two reels may be provided by the drive rollers and the feed-out roller. By driving the drive roller which is the last roller in contact with the tape prior to its being wound upon the pickup reel at a slightly faster speed than the other drive roller, tension can be imparted to the tape just prior to its being wound upon the pickup reel. By applying a controlled amount of braking force to the feed-out roller during the transportation of the tape, under the influence of the drive rollers, from the source reel to the pickup reel, a controlled amount of drag may be imparted to the source reel and a controlled degree of tension thereby imparted to the tape.

The manner of operation of the present invention and the manner in which it achieves the above and other advantages may be more clearly understood by reference to the following detailed description when considered with the drawing in which.

Figures 1, 2, 3:
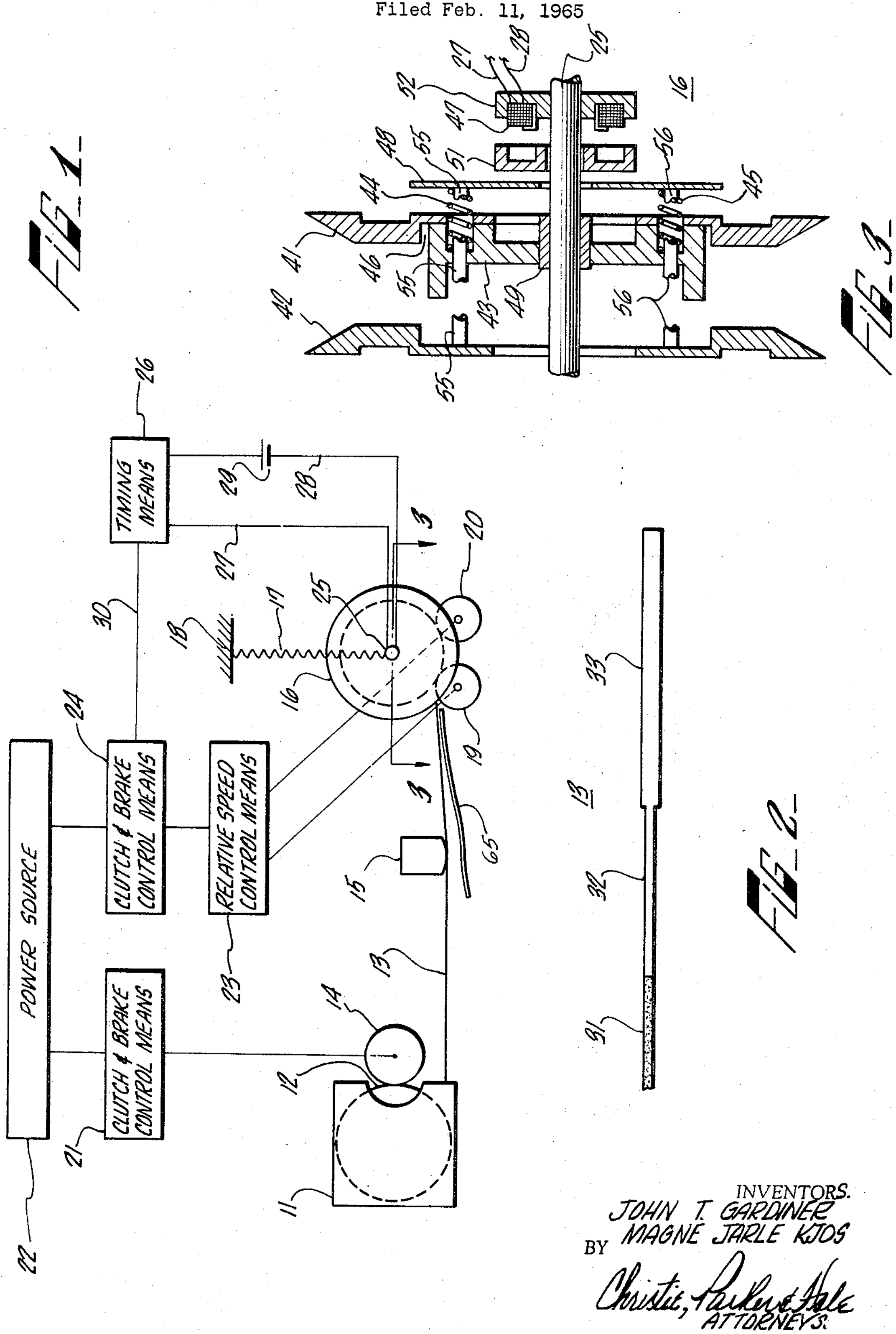
FIG. 1 depicts, partially in block diagram form, a basic form of the present invention.
FIG. 2 depicts an end portion of the magnetic tape shown in FIG. 1.
FIG. 3 depicts in an exploded view a cross-section along line 3—3 of the pickup reel shown in FIG. 1.

FIG. 1 depicts cartridge 11 which houses source reel 12 on which is wound magnetic tape 13. The cartridge 11, including its reel 12 and tape 13, may be of the type presently being sold commercially by the Minnesota Mining and Manufacturing Co. Cartridge 11 has a plastic casing, a portion of which is cut away to expose a portion of reel 12. Feed-out and rewind roller 14 is shown in driving contact with the exposed portion of reel 12. Tape 13 extends from cartridge 11, past a recording head 15 to pickup reel 16. Head 15 may be of any conventional kind capable of writing information onto or reading information from the tape 13. Pickup reel 16 is shown schematically as being loaded by compression spring 17 affixed to housing 18. Spring 17 allows pickup reel 16 to move freely in a vertical direction and achieves driving contact between reel 16 and rollers 19 and 20. The housing 18 is shown for illustrative purposes solely as a support means for spring 17. Actually, housing 18 comprises an assembly which houses all of the elements shown in FIG. 1, but since housing 18 is not material to an understanding of the present invention, it has been omitted for the purpose of clarity of illustration. The spring 17 is also shown for illustrative purposes as connected directly between housing 18 and shaft 25 about which reel 16 rotates. The reel 16 may be spring loaded from housing 18 by any conventional means which permits movement of the reel 16 in a vertical direction, gives proper load, and which, advantageously, also guides reel 16 to prevent lateral misalignment with tape 13.

Pickup reel 16 is supported by drive rollers 19 and 20. Rollers 19 and 20 fit between the flanged side portions of reel 16 and make contact with tape 13 at the points of reel support. It is not essential that pickup reel 16 be free to move in a vertical direction as shown in FIG. 1. It is only necessary that there be relative movement between rollers 19 and 20 and reel 16 as tape is wound and unwound from reel 16 in order that rollers 19 and 20 may drive both the tape 13 and reel 16 during the winding and unwinding operations.

Feed-out and rewind roller 14 is shown schematically to be connected to clutch and brake control means 21 which in turn is schematically shown to be connetced to power source 22. Similarly, drive rollers 19 and 20 are schematically shown to be connected to relative speed control means 23, which in turn is connected to clutch and brake control means 24, which in turn is also connected to power source 22.

Power source 22, shown in block diagram form, may comprise any conventional power source capable of driving the rollers 14, 19, and 20 such as, for example, a small electric motor. Clutch and brake control means 21 and 24, also shown in block diagram form, may comprise conventional clutches and brakes for transmitting rotational power from source 22 to rollers 14, 19, and 20, and for quickly bringing the rollers to a halt. Relative speed control means 23, also shown in block diagram form, may comprise conventional means such as, for example, a belting apparatus for determniing the relative speeds imparted to drive rollers 19 and 20. A shield 65 serves to guide tape 13 to drive rollers 19 and 20 during the feed-out phase of operation.

Timing means 26, shown in block diagram form, has leads 27 and 28 connected thereto and lead 28 includes battery 29. Leads 27 and 28 are connected to an electromagnetic holding coil 47 which is mounted on shaft 25. Coil 47 is shown in FIG. 3 and discussed in the description thereof. For illustrative purposes, leads 27 and 28 are shown in FIG. 1 as being connected to shaft 25. Timing means 26 may comprise any conventional means for completion, at a desired time, of the circuit between battery 29 and coil 47. Advantageously, timing means 26 may be activated simultaneously with the application of power to drive rollers 19 and 20; such simultaneous activation of timing means 26 is indicated for illustrative purposes by means of lead 30 between timing means 26 and clutch and brake control means 24.

FIG. 2 depicts an end portion of tape 13. The end shown is the portion of tape 13 which first unwinds from source reel 12 and passes to pickup reel 16 during the feed-out phase of operation. As stated before, the tape 13 shown is of a type currently sold by the Minnesota Mining and Manufacturing Co. The tape 13 has spliced to the end of information storing portion 31 thereof a stiff plastic leader. The leader has a narrow portion 32 spliced directly to portion 31 and a wide portion 33. The information storing tape portion 31 and narrow leader portion 32 are about .146 inch in width while the wide leader portion 33 is about .250 inch in width. It is of course not necessary to the present invention that tape 13 be of these dimensions. It is only necessary that tape 13 have a leader portion which is wider than the remainder of the tape.

FIG. 3 depicts an exploded cross-sectional view of pickup reel 16 taken along line 3—3 of FIG. 1. The pickup reel 16 has two flanged side portions 41 and 42 with side 41 having a central hub 43 affixed thereto. Side 42 is normally held against hub 43 of side 41 by means of springs 44 and 45. Springs 44 and 45 fit within spaces provided therefor in hub 43 and exert a force between hub 43 and a plate of spring material 48. Plate 48 is not affixed to side 41 of hub 43 but its affixed by means of separators 55 and 56 to movable flange 42. For illustrative purposes screws affixing separators 55 and 56 to side 42 and plate 48 are not shown in FIG. 3. Side 41 is free to rotate about shaft 25 but is held in a stationary position along the shaft by holding means, such as retaining rings, for example, not shown in FIG. 3. The springs 44 and 45 fit about separators 55 and 56, respectively, and exert a force on plate 48 which tends to hold movable side 42 in a collapsed condition against hub 43. When the springs thus hold side 42 against hub 43, the sides 41 and 42 are then a distance apart which is smaller than the width of the wide portion 33 of the plastic leader. When the leader portion 33 is driven between sides 41 and 42, it compresses the springs 44 and 45 and forces side 42 away. The space 46 between the portions of sides 41 and 42 immediately adjacent hub 3 is wide enough to hold portion 33 of the leader and, upon the winding of portion 33 about hub 43, springs 44 and 45 collapse side 42 against hub 43. Hub 43 is also affixed to bearing portion 49. The entire reel 16 as described thus far is free to rotate about shaft 25 and is essentially similar to the pickup reel utilized in the Revere recorder referred to previously.

Additionally, reel 16 has a first magnetic piece 51 affixed to plate 48. A mating magnetic piece 52 is affixed to shaft 25. Magnetic piece 52 has electromagnetic coil 47 positioned therein and leads 27 and 28 connect coil 47 within the circuit shown in FIG. 1.

When reel 16 is in a collapsed condition, magnetic pieces 51 and 52 almost contact one another. Energization of coil 47 at this time locks reel 16 in the collapsed condition since magnetic flux about coil 47 in a path including magnetic pieces 51 and 52 tends to prevent movement of piece 51, and consequently of plate 48, away from magnetic piece 52. Magnetic pieces 51 and 52 must not be in actual contact since piece 51 rotates with reel 16 while piece 52 is affixed to nonrotating shaft 25. Advantageously, piece 51 has a portion thereof cut away and the coil 47 positioned in piece 52 extends somewhat therefrom to fit within the cutaway portion of piece 51 at this time and to insure strong magnetic coupling between the magnetic pieces 51 and 52.

When reel 16 is in an extended condition with side 42 pushed away from side 41, energization of coil 47 will have little effect on magnetic pieces 51 and 52. At this time the compression of springs 44 and 45 have moved plate 48 and magnetic piece 51 sufficiently far from magnetic piece 52 so that the air gap between pieces 51 and 52 prevents the creation of strong magnetic attractive forces between these pieces upon energization of coil 47.

The several phases of operation of the present invention will now be described.

Initially, the feed-out phase of operation serves to draw tape 13 out of cartridge 11 and transport it to pickup reel 16. The feed-out phase of operation for the present invention is very similar to the corresponding phase of operation of the Revere recorder previously referred to. The feed-out and rewind roller 14 is caused to drive source reel 12 in a direction to unwind tape 13 from reel 12. The wide portion 33 of the leader is wider than the distance between the two flanged sides of reel 12 and it therefore is wound upon the edges of reel 12. Consequently, feed-out reel 14 rolls directly upon the leader at this time rather than directly upon the reel 12. The wide portion 33 of the leader is long enough to permit the end of the leader to reach the point of contact between drive roller 19 and pickup reel 16 while feed-out roller 14 is still rolling directly upon the wide portion 33 of the leader. As the leader is drawn out of source reel 12, past recording head 15, it is directed by guide 65 to the point of contact between drive roller 19 and pickup reel 16.

The distance between the outer portion of flanged sides 41 and 42 of pickup reel 16 is narrower than the width of the wide portion 33 of the leader. Consequently, as the leader is passed between the sides 41 and 42 of reel 16, the leader pushes movable flange 42 away.

The Revere recorder requires that the pickup reel 16 be driven during a take-up phase of operation which follows the feed-out phase of operation. The take-up phase of operation continues until the wide leader portion 33 is completely within a space 46 adjacent hub 43 and between the inner portions of sides 41 and 42, at which time the sides 41 and 42 again collapse together thereby completing the take-up phase of operation.

The necessity of a take-up phase of operation is eliminated in the present invention. Upon completion of the feed-out phase of operation, the drive rollers 19 and 20 may be driven at full speed and the forward phase of operation may commence. The completion of the taking up of tape 13 by pickup reel 16 occurs during the initial part of the forward phase of operation and pickup reel 16, therefore, need not first be driven at a much slower take-up speed.

To prevent buckling of tape 13 either while it is being taken up by pickup reel 16 or during subsequent operations, the space between flanged sides 41 and 42 of reel 16 is made narrower than in the corresponding pickup reel of the Revere recorder. Thus, a wider edge and better gripping action is obtained at the space 46 in which the wide portion 33 of the leader is held during operation of the tape transport assembly. In addition, energization of electromagnetic holding coil 47 tends to lock together sides 41 and 42 of pickup reel 16 during operation of the assembly thereby tending further to prevent any buckling of tape 13. If coil 47 is energized simultaneously with the application of power to drive rollers 19 and 20, coil 47 will have no locking effect until the wide portion 33 of the leader is wound on hub 43 and the sides 41 and 42 have collapsed together. Thus, energization of holding coil 47 does not interfere with the taking up of the wide leader portion 33 onto pickup reel 16.

During the reverse phase of operation, tape 13 is driven backward by drive rollers 19 and 20 and is fed out from pickup reel 16 at a fixed speed. At this time a reverse drive is also applied to feed-out and rewind roller 14. Although drive rollers 19 and 20 and rewind roller 14 are all driven by the same power source and a constant r.p.m. drive is applied to rollers 19 and 20, the drive on roller 14 cannot be simply a constant r.p.m. drive. Since the tape 13 is being driven at a constant speed by drive rollers 19 and 20, source reel 12 must be driven at a decreasing speed as the tape 13 is rewound upon reel 12. This problem is solved by overdriving the rewind reel 14, that is, driving it at a faster speed than necessary, while at the same time permitting clutch slippage within clutch and brake control means 21. Thus, the drive rollers 19 and 20 control the speed of tape 13 as it is rewound on source reel 12 and it may be driven past recording head 15 at a constant speed.

During a fast rewind phase of operation, the drive rollers 19 and 20 are allowed to freewheel and the speed of rewinding is controlled by the speed of rewind roller 14. At this time there will be no clutch slippage in the clutch and brake control means 21.

It is essential, especially in digital data applications where tape speeds will exceed 20 inches per second, that the tape may be brought to a rapid halt. Fast stops are effectuated by braking roller 14 and rollers 19 and 20 by the brakes of the clutch and brake control means 21 and 24, respectively.

In order to achieve tight winding of tape 13 upon reels 12 and 16 and to assure proper tension in tape 13 as it passes recording head 15, it is advantageous to be able to control the tension in tape 13. Tension is imparted to tape 13 just prior to its being wound upon pickup reel 15 by driving drive roller 20 at a slightly greater speed than drive roller 19. Further tension may be imparted to the tape 13 during the forward phase of operation by application of a braking force to roller 14 from clutch and brake control means 21. As a result roller 14 imparts a drag to source reel 12 as it unwinds and imparts tension to tape 13. During the reverse drive phase of operation, the overdriving of roller 14 imparts tension to tape 13 as it is rewound upon source reel 12.

What has been described is considered to be only one illustrative embodiment of the present invention. Accordingly, it is to be understood that various and numerous other arrangements may be devised by one skilled in the art without departing from the spirit and scope of this invention.

What is claimed is:

1. A tape transport assembly comprising:
a supply reel,
the supply reel having two flanged side portions and a hub portion therebetween and having magnetic tape wound therearound,
a pickup reel,
means for transporting the tape from the supply reel to the pickup reel comprising a feed-out and rewind roller in contact with the two flanged side portions of the supply reel,
a recording head positioned between the supply reel and the pickup reel in close proximity to the path followed by the magnetic tape, and
means for winding the tape about the pickup reel and for transporting the tape past the recording head at a constant speed comprising
first and second tape drive rollers supporting the pickup reel and in driving contact with the pickup reel and with the tape at the points of reel contact, the tape contacting both drive rollers as it is being wound on the pickup reel,
means for maintaining driving contact between the drive rollers and both the pickup reel and tape as the tape is wound onto the pickup reel,
a power source,
control means for operatively connecting the tape drive rollers to the power source, and
means for imparting constant speeds to the tape drive rollers.

2. A tape transport assembly according to claim 1 further comprising control means for operatively connecting the feed-out and rewind roller to the power source.

3. A tape transport assembly according to claim 1 in which the means for imparting constant speeds to the tape drive rollers imparts a first constant speed to the one of the tape drive rollers nearer said recording head and a second faster constant speed to the other one of the tape drive rollers.

4. A tape transport assembly comprising:
a supply reel, the supply reel having information storing tape wound therearound,
a pickup reel,
means for detecting information stored in the tape,
means for transporting the tape from the supply reel to the pickup reel comprising a feed-out and rewind roller in contact with the supply reel,
the detecting means being positioned between the supply reel and the pickup reel in close proximity to the path followed by the tape, and
means for winding the tape about the pickup reel and for transporting the tape past the detecting means at a constant speed comprising
tape drive roller means supporting the pickup reel and in driving contact with the pickup reel and with the tape at the point of reel contact,
means for maintaining driving contact between the roller means and both the pickup reel and tape as the tape is wound onto the pickup reel,
a power source, control means for operatively connecting the tape drive roller means to the power source, and
means for imparting constant speed to the tape drive roller means.

5. A tape transport assembly comprising:
a supply reel,
a pickup reel,
a recording head positioned between the supply reel and the pickup reel,
a spool of magnetic tape wound partially about the supply reel and partially about the pickup reel and passing between them in close proximity to the recording head, and
means for transporting the tape past the recording head at a constant speed comprising
first and second tape drive rollers supporting the pickup reel and in driving contact with the pickup reel and with the tape at the points of reel contact, the tape contacting both drive rollers as it is being wound on the pickup reel,
means for maintaining driving contact between the drive rollers and both the pickup reel and tape as the tape passes between the supply reel and pickup reel,
a power source,
control means for operatively connecting the tape drive rollers to the power source, and
means for imparting constant speeds to the tape drive rollers.

6. A tape transport assembly comprising:
a supply reel,
a pickup reel,
a recording head positioned between the supply reel and the pickup reel,
a spool of magnetic tape wound partially about the supply reel and partially about the pickup reel and passing between them in close proximity to the recording head, and
means for transporting the tape from the supply reel to the pickup reel and past the recording head at a constant speed in excess of twenty inches per second comprising
first and second tape drive rollers supporting the pickup reel and in driving contact with the pickup reel and with the tape at the points of reel contact, the tape contacting both drive rollers as it is being wound on the pickup reel,
means for maintaining driving contact between the drive rollers and both the pickup reel and tape as the tape is wound onto the pickup reel,
a power source,
control means for operatively connecting the tape drive rollers to the power source, and
means for imparting differential constant speeds to the tape drive rollers to impart tension in the tape, the tape drive roller last making contact with the tape before it is wound on the pickup reel being driven at a faster speed than the other tape drive roller.

7. A tape transport assembly comprising:
a supply reel,
a pickup reel,
a recording head positioned between the supply reel and the pickup reel,
a spool of magnetic tape wound partially about the supply reel and partially about the pickup reel and and passing between them in close proximity to the recording head, and
means for transporting the tape from the pickup reel to the supply reel and past the recording head at a constant speed in excess of twenty inches per second comprising
first and second tape drive rollers supporting the pickup reel and in driving contact with the pickup reel and with the tape at the points of reel contact, the tape contacting both drive rollers as it is being wound on the pickup reel, the pickup reel being spring loaded against the drive rollers, the spring maintaining driving contact between the drive rollers and both the pickup reel and the tape,
a power source,
control means for operatively connecting the tape drive rollers to the power source,
means for imparting constant speeds to the tape drive rollers,
a feed-out and rewind roller in contact with the supply reel, and
control means for operatively connecting the feed-out and rewind roller to the power source, the connection being made by means of a slippable clutch, the slipping of the clutch permitting the tape drive rollers to determine the speed of the tape past the recording head.

8. A tape transport assembly comprising:
a supply reel,
the supply reel having magnetic tape wound therearound,
a pickup reel,
means for transporting the tape from the supply reel to the pickup reel comprising a feed-out and rewind roller in contact with the supply reel,
control means comprising means for operatively connecting the feed-out and rewind roller to the power source and brake means for bringing the feed-out and rewind roller to a rapid halt,
a recording head positioned between the supply reel and the pickup reel in close proximity to the path followed by the magnetic tape, and
means for winding the tape about the pickup reel and for transporting the tape past the recording head at a constant speed comprising
first and second tape drive rollers in driving contact with the pickup reel and with the tape at the points of reel contact,
means for maintaining driving contact between the drive rollers and both the pickup reel and tape as the tape is wound onto the pickup reel,
a power source,
control means comprising means for operatively connecting the tape drive rollers to the power source and brake means for bringing the drive rollers to a rapid halt, and
means for imparting constant speeds to the tape drive rollers.

9. A tape transport assembly comprising:
a supply reel,
the supply reel having magnetic tape wound therearound,
a pickup reel comprising first and second flanged side portions and a hub portion affixed to said first side portion, the second side portion being held in a collapsed condition against the hub portion by spring means,
means for transporting the tape from the supply reel to the pickup reel comprising a feed-out and rewind roller in contact with the supply reel,
a recording head positioned between the supply reel and the pickup reel in close proximity to the path followed by the magnetic tape, and
means for winding the tape about the pickup reel and for transporting the tape past the recording head at a constant speed comprising
first and second tape drive rollers in driving contact with the pickup reel and with the tape at the points of reel contact,
means for maintaining driving contact between the drive rollers and both the pickup reel and tape as the tape is wound onto the pickup reel,
a power source,
control means for operatively connecting the tape drive rollers to the power source, and means for imparting constant speeds to the tape drive rollers.

10. A tape transport assembly according to claim 9 in which one end of a plastic leader is spliced to the magnetic tape, the leader at its other end being wider than the tape, the parts of the first and second flanged side portions of the pickup reel near the hub being a distance apart greater than the width of the leader at its other end, and the remaining parts of the flanged side portions being a distance apart smaller than the width of the leader at its other end but greater than the width of the magnetic tape.

11. A tape transport assembly according to claim 10 further comprising a solenoid within the hub portion of the pickup reel and means for energizing the solenoid to aid the spring means in holding the second flanged side portion in a collapsed condition.

12. A tape transport assembly according to claim 10 in which said tape drive rollers fit between said first and second flanged side portions of said pickup reel.

13. A tape transport assembly comprising:

a supply reel, a pickup reel, a recording head positioned between the supply reel and the pickup reel, a spool of magnetic tape wound partially about the supply reel and partially about the pickup reel and passing between them in close proximity to the recording head, and means for transporting the tape from the supply reel to the pickup reel and past the recording head at a constant speed in excess of twenty inches per second comprising first and second tape drive rollers in driving contact with the pickup reel and with the tape at the points of reel contact, means for maintaining driving contact between the drive rollers and both the pickup reel and tape as the tape is wound onto the pickup reel, a power source, control means for operatively connecting the tape drive rollers to the power source, means for imparting differential constant speeds to the tape drive rollers to impart tension in the tape, the tape drive roller last making contact with the tape before it is wound on the pickup reel being driven at a faster speed than the other tape drive roller, and means for imparting additional tension in said tape comprising a feed-out and rewind roller in contact with the supply reel and control means operatively connected between the power source and the feed-out and rewind roller for applying a braking force on said roller thereby imparting a drag on the supply reel.

References Cited

UNITED STATES PATENTS

| | | | |
|---|---|---|---|
| 2,354,952 | 8/1944 | Hornbostel | 242—66 |
| 2,367,777 | 1/1945 | Hornbostel | 242—75.5 |
| 2,623,702 | 12/1952 | Masterson | 242—55.12 |
| 2,891,736 | 6/1959 | Blaes. | |
| 3,235,194 | 2/1966 | Willis | 242—55.14 |
| 3,254,856 | 6/1966 | Camras | 242—55.13 |

FRANK J. COHEN, *Primary Examiner.*

G. F. MAUTZ, *Assistant Examiner.*